US008625526B2

(12) United States Patent
Han et al.

(10) Patent No.: US 8,625,526 B2
(45) Date of Patent: Jan. 7, 2014

(54) METHOD FOR OBTAINING SYNCHRONIZATION SIGNAL IN WIRELESS COMMUNICATION SYSTEM

(75) Inventors: Seung Hee Han, Anyang-si (KR); Min Seok Noh, Anyang-si (KR); Jin Sam Kwak, Anyang-si (KR); Hyun Woo Lee, Anyang-si (KR); Dong Cheol Kim, Anyang-si (KR); Sung Ho Moon, Anyang-si (KR); Wook Bong Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 12/811,465

(22) PCT Filed: Dec. 31, 2008

(86) PCT No.: PCT/KR2008/007902

§ 371 (c)(1), (2), (4) Date: Jul. 1, 2010

(87) PCT Pub. No.: WO2009/084931

PCT Pub. Date: Jul. 9, 2009

(65) Prior Publication Data

US 2010/0296429 A1 Nov. 25, 2010

Related U.S. Application Data

(60) Provisional application No. 61/018,888, filed on Jan. 3, 2008, provisional application No. 61/019,581, filed on Jan. 7, 2008.

(30) Foreign Application Priority Data

Jul. 25, 2008 (KR) ........................ 10-2008-0072848

(51) Int. Cl.
*H04W 4/00* (2009.01)

(52) U.S. Cl.
USPC ........... 370/330; 370/390; 370/432; 370/436; 370/503

(58) Field of Classification Search
None
See application file for complete search history.

(56) References Cited

U.S. PATENT DOCUMENTS

| | | | | |
|---|---|---|---|---|
| 7,277,737 | B1 * | 10/2007 | Vollmer et al. | 455/574 |
| 2005/0270969 | A1 * | 12/2005 | Han et al. | 370/210 |
| 2006/0098567 | A1 * | 5/2006 | Willenegger et al. | 370/206 |
| 2006/0146745 | A1 | 7/2006 | Cai et al. | |
| 2008/0101326 | A1 * | 5/2008 | Zhang et al. | 370/345 |
| 2008/0132263 | A1 * | 6/2008 | Yu et al. | 455/515 |
| 2009/0086713 | A1 * | 4/2009 | Luo | 370/350 |

FOREIGN PATENT DOCUMENTS

| | | | |
|---|---|---|---|
| KR | 10-2004-0014333 | A | 2/2004 |
| KR | 10-2007-0022767 | A | 2/2007 |
| KR | 10-2007-0068466 | A | 6/2007 |

* cited by examiner

*Primary Examiner* — Faruk Hamza
*Assistant Examiner* — Tito Pham
(74) *Attorney, Agent, or Firm* — McKenna Long & Aldridge LLP

(57) ABSTRACT

A method for obtaining a synchronization signal in a wireless communication system includes dividing a full frequency band into a synchronization band for transmission of the synchronization signal and a usual band for transmission of multicast broadcast multimedia service (MBMS) data, and searching for a primary synchronization signal (PSS) for a dedicated MBMS in the synchronization band, and detecting the PSS for the dedicated MBMS through the synchronization band.

7 Claims, 12 Drawing Sheets

METHOD FOR OBTAINING SYNCHRONIZATION SIGNAL IN WIRELESS COMMUNICATION SYSTEM

This application is a 35 U.S.C. §371 National Stage entry of International Application No. PCT/KR2008/007902, filed on Dec. 31, 2008, and claims priority to U.S. Provisional Application Nos. 61/018,888, filed Jan. 3, 2008, 61/019,581, filed Jan. 7, 2008, and Korean Application No. 10-2008-0072848, filed on Jul. 25, 2008 each of which is hereby incorporated by reference in its entirety as if fully set forth herein.

TECHNICAL FIELD

The present invention relates to wireless communications, and more particularly, to a method for obtaining a synchronization signal for a multimedia broadcast multicast service (MBMS).

BACKGROUND ART

A multimedia broadcast multicast service (MBMS) is a service in which a plurality of base stations (BSs) transmit the same downlink signal in a single frequency network (SFN) system. The MBMS can obtain an SFN combining gain between cells by performing a multicast broadcast single frequency network (MBSFN) operation. The SFN combining gain denotes a diversity gain obtained in a receiving end by transmitting the same information for each cell without an extra operation. When the plurality of BSs transmit the same signals, the same signals transmitted from multiple cells act as self signals instead of acting as inter-cell interference. As a result, the same effect as multipath fading is produced, and thus a frequency diversity gain and a macro diversity gain can be obtained. On the other hand, a unicast service is a service in which a user equipment (UE) accesses to a BS to transmit/receive data from/to the BS. In a specific cell, only the unicast service may be provided, or the MBMS may be provided together with the unicast service, or only the MBMS may be provided. When only the MBMS is provided, it is called a dedicated MBMS.

In a wideband code division multiple access (WCDMA) system, synchronization signals are transmitted through a primary synchronization channel (P-SCH) and a secondary synchronization channel (S-SCH). The UE can obtain slot synchronization by using a primary synchronization signal (PSS) transmitted through the P-SCH. The UE can obtain frame synchronization by using a secondary synchronization signal (SSS) transmitted through the S-SCH. System configuration information is transmitted through a physical broadcast channel (P-BCH).

The UE performs synchronization through the P-SCH and the S-SCH in an initial cell search procedure which is initially performed after power is on and a non-initial cell search procedure which performs handover or neighbor cell measurement.

Thereafter, the UE obtains basic system information which is broadcast through the P-BCH. A service provided in a cell may be a unicast service or a dedicated MBMS. A reference signal used in the unicast service has a different structure from that used in the dedicated MBMS. The UE cannot know whether the service provided in the cell is the unicast service or the dedicated MBMS, and thus performs blind detection by estimating channels for both a unicast reference signal and a dedicated MBMS reference signal in a P-BCH decoding process. As a result, an operation time required for obtaining system information by the UE is delayed.

Accordingly, there is a need for a method capable of effectively obtaining a synchronization signal and system information in a wireless communication system in which a unicast service and an MBMS can coexist.

DISCLOSURE OF INVENTION

Technical Problem

The present invention provides a method for obtaining a synchronization signal for a multimedia broadcast multicast service (MBMS).

Technical Solution

In an aspect, a method for obtaining a synchronization signal in a wireless communication system includes dividing a full frequency band into a synchronization band for transmission of the synchronization signal and a usual band for transmission of multicast broadcast multimedia service (MBMS) data, and searching for a primary synchronization signal (PSS) for a dedicated MBMS in the synchronization band, and detecting the PSS for the dedicated MBMS through the synchronization band.

In another aspect, a method for transmitting a synchronization signal in a wireless communication system includes transmitting a PSS through a synchronization band having a part of a bandwidth of a full frequency band, and transmitting MBMS data through a usual band excluding the synchronization band from the full frequency band, wherein a root index of the PSS is one of root indices of a plurality of Zadoff-Chu (ZC) sequences selected in an ascending order of a frequency offset sensitivity.

Advantageous Effects

A process of obtaining a synchronization signal and system information in a dedicated multimedia broadcast multicast service (MBMS) can be effectively performed, and a single frequency network (SFN) combining gain of broadcasting information received through a physical broadcast channel (P-BCH) can be obtained.

MODE FOR THE INVENTION

Figure 1:
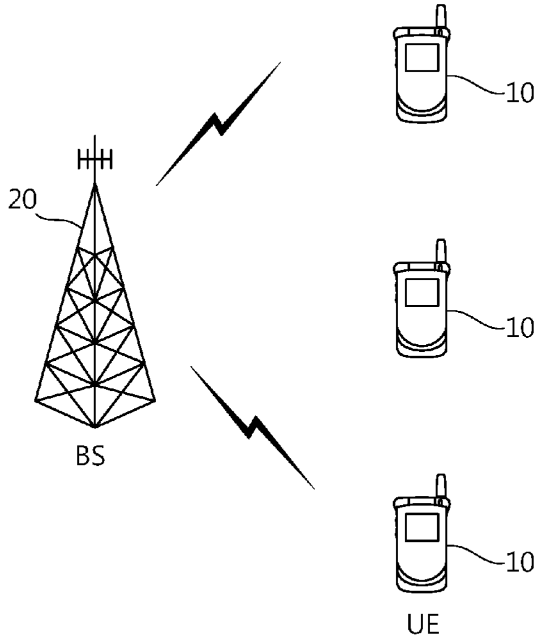
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink represents a communication link from the BS 20 to the UE 10, and an uplink represents a communication link from the UE 10 to the BS 20. In downlink, a transmitter may be a part of the BS 20, and a receiver may be a part of the UE 10. In uplink, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The BS 20 can transmit downlink data in a unicast, multicast, or broadcast manner. A unicast service is a service in which the UE 10 accesses to the BS 20 to transmit and receive user-specific data. A multicast service is a service in which two or more UEs 10 accessed to the BS 20 are configured into a UE group to transmit UE group specific data. A broadcast service is a service for transmitting data which needs to be commonly received by all UEs 10 within a cell.

Meanwhile, the BS 20 can provide a multimedia broadcast multicast service (MBMS). The MBMS is a service in which a plurality of BSs transmit the same downlink data so that the UE can obtain a single frequency network (SFN) combining gain. The MBMS may be provided together with the unicast service or may be provided alone. A service for providing the MBMS alone is referred to as a dedicated MBMS.

Figure 2:
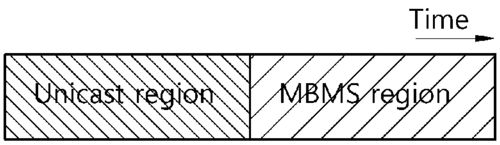
FIG. 2 shows an exemplary frame for supporting both a unicast service and a multicast broadcast multimedia service (MBMS).

FIG. 2 shows an exemplary frame for supporting both a unicast service and an MBMS.

Referring to FIG. 2, the frame for supporting the MBMS in the unicast service includes a unicast region for the unicast service and an MBMS region for the MBMS. The unicast region and the MBMS region may be multiplexed using a time division multiplexing (TDM) scheme in which the regions are divided in a time domain. Of course, the unicast region and the MBMS region may also be multiplexed using a frequency division multiplexing (FDM) scheme in which the regions are divided in a frequency domain.

Figure 3:
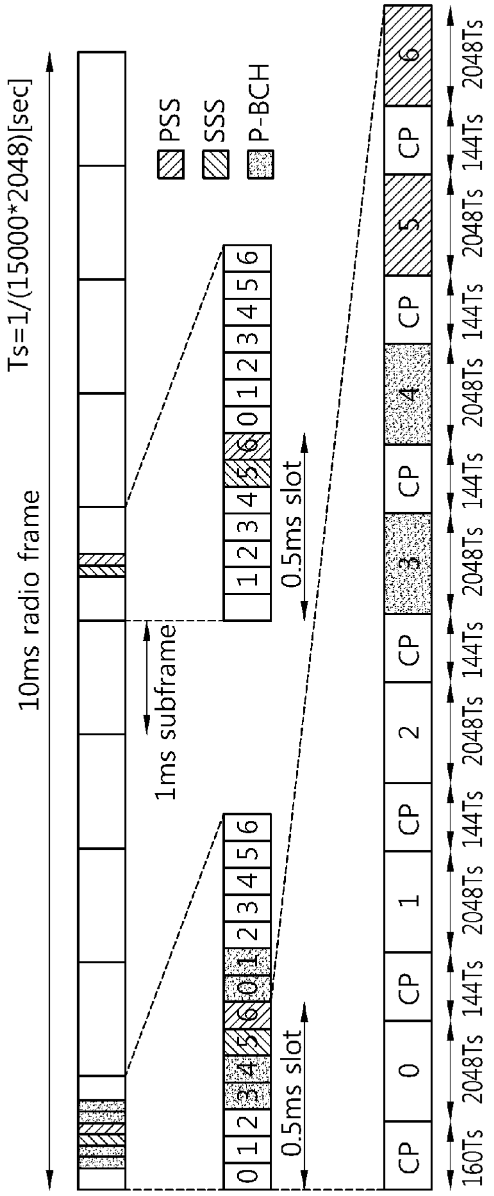
FIG. 3 shows an exemplary structure of a radio frame.

FIG. 3 shows an exemplary structure of a radio frame. The radio frame uses a normal cyclic prefix (CP). This may be found in sections 4.1 and 6.11 in the 3GPP TS 36.211 v8.1.0 (2007-11) "Physical channel and modulation".

Referring to FIG. 3, the radio frame may consist of 10 subframes, and one subframe may include two slots. One slot may include a plurality of OFDM symbols in a time domain. The number of OFDM symbols included in one slot may be determined variously according to a CP structure. In a radio frame using a normal CP size, one slot may include 7 OFDM symbols. When an OFDM symbol has a length of 2048 Ts in a radio frame with a length of 10 ms, the normal CP size may be 144 Ts (i.e., Ts=1/(15000×2048)sec).

A primary synchronized signal (PSS) is transmitted through a last OFDM symbol in each of a $0^{th}$ slot and a $10^{th}$ slot. The same PSS is transmitted through the two OFDM symbols. The PSS is used to obtain time domain synchronization and/or frequency domain synchronization such as OFDM symbol synchronization, slot synchronization, etc. A Zadoff-Chu (ZC) sequence may be used for the PSS. The wireless communication system has at least one PSS.

A secondary synchronization signal (SSS) is transmitted through an immediately previous OFDM symbol of the last OFDM symbol in each of the $0^{th}$ slot and the $10^{th}$ slot. The SSS and the PSS may be transmitted through contiguous OFDM symbols. Different SSSs are transmitted through the two OFDM symbols. The SSS is used to obtain frame synchronization and/or CP configuration of a cell, that is, usage information of a normal CP or an extended CP. An m-sequence may be used for the SSS. One OFDM symbol includes two m-sequences. For example, if one OFDM symbol includes 63 subcarriers, two m-sequences, each with a length of 31, are mapped to one OFDM symbol.

A physical-broadcast channel (P-BCH) is located in a $0^{th}$ subframe in the radio frame. The P-BCH starts from a $3^{rd}$ OFDM symbol (starting from a $0^{th}$ OFDM symbol) of the $0^{th}$ subframe and occupies 4 OFDM symbols excluding the PSS and the SSS. The P-BCH is used to obtain basic system configuration information of a corresponding BS. The P-BCH may have a period of 40 ms.

Figure 4:
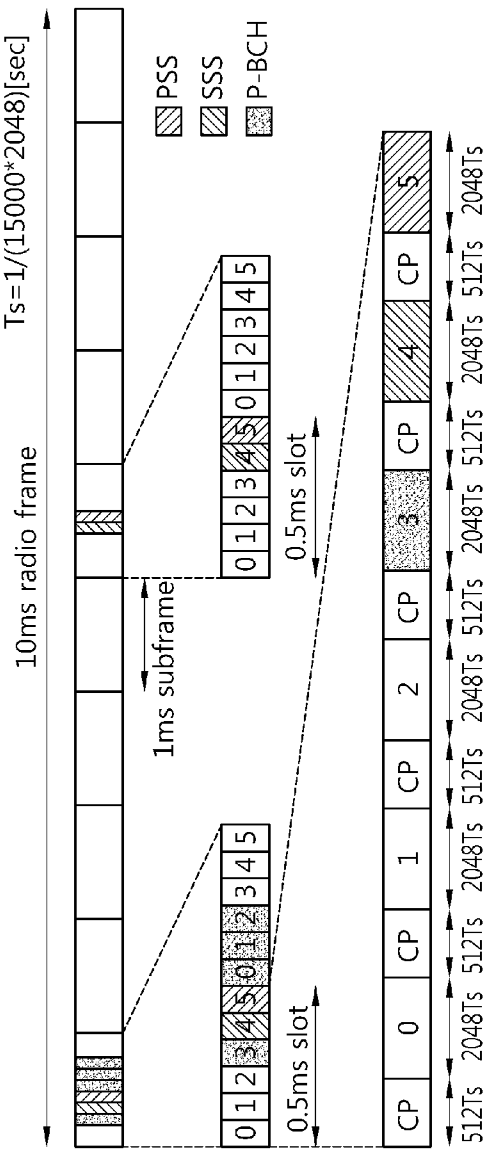
FIG. 4 shows another exemplary structure of a radio frame.

FIG. 4 shows another exemplary structure of a radio frame. The radio frame uses an extended CP.

Referring to FIG. 4, in comparison with the radio frame using the normal CP, 6 OFDM symbols are included in one slot of the radio frame using the extended CP. If an OFDM symbol has a length of 2048 Ts in a radio frame with a length of 10 ms, a size of the extended CP may be 512 Ts (i.e., Ts=1/(15000×2048)sec).

In the radio frame using the extended CP, a PSS is transmitted through a last OFDM symbol in each of a $0^{th}$ slot and a $10^{th}$ slot, and an SSS is transmitted through an immediately previous OFDM symbol of the last OFDM symbol in each of the $0^{th}$ slot and the $10^{th}$ slot. The P-BCH is located in a $0^{th}$ subframe in the radio frame. The P-BCH starts from a $3^{rd}$ OFDM symbol of the $0^{th}$ subframe and occupies four OFDM symbols excluding the PSS and the SSS.

Now, generation of a PSS and an SSS in a radio frame using a normal CP or a radio frame using an extended CP will be described. A ZC sequence may be used as the PSS. An m-sequence may be used as the SSS.

The ZC sequence is one type of a constant amplitude zero auto-correlation (CAZAC) sequence. If $N_{ZC}$ denotes a length of the ZC sequence and is a positive integer, and if u denotes a root index and is a relatively prime to $N_{ZC}$ (where u is a natural number less than or equal to $N_{ZC}$ and is relatively prime to $N_{ZC}$), then a kth element of a uth ZC sequence can be expressed by Equation 1 below (where $k=0,1,\ldots,N_{ZC}-1$).

MathFigure 1

$$d^u(k) = \exp\left\{-j\frac{\pi uk(k+1)}{N_{ZC}}\right\} \quad \text{[Math. 1]}$$

when $N_{ZC}$ is odd number $$d^u(k) = \exp\left\{-j\frac{\pi uk^2}{N_{ZC}}\right\}$$

when $N_{ZC}$ is even number

MathFigure 2

$$|d(k)| = 1 \quad \text{[Math. 2]}$$

for all $k$, $N_{ZC}$, $u$

MathFigure 3

$$R_{u;N_{ZC}}(m) = \begin{cases} 1, & \text{for } m = 0 \\ 0, & \text{for } m \neq 0 \end{cases} \quad \text{[Math. 3]}$$

MathFigure 4

$$R_{u_1;u_2;N_{ZC}}(m) = const \quad \text{[Math. 4]}$$

for all $u_1$, $u_2$

Equation 2 shows that the ZC sequence always has a size of 1. Equation 3 shows that auto-correlation of the CAZAC sequence is indicated by a Dirac-delta function. The auto-correlation is based on circular correlation. Equation 4 shows that cross correlation is always constant.

The m-sequence is one of pseudo-noise (PN) sequences. The PN sequence can be reproduced and shows a characteristic similar to a random sequence. The PN sequence is characterized as follows. (1) A repetition period is sufficiently long. If a sequence has an infinitely long repetition period, the sequence is a random sequence. (2) The number of 0s is close to the number of is within one period. (3) A portion having a run length of 1 is ½, a portion having a run length of 2 is ¼, a portion having a run length of 3 is ⅛, and so on. Herein, the run length is defined as the number of contiguous identical symbols. (4) A cross-correlation between sequences within one period is significantly small. (5) A whole sequence cannot be reproduced by using small sequence pieces. (6) Reproducing is possible by using a proper reproducing algorithm. A PN sequence includes an m-sequence, a gold sequence, a Kasami sequence, etc. In addition to the aforementioned characteristics, the m-sequence has an additional characteristic in which a side lobe of a periodic auto-correlation is −1.

The PSS and the SSS are used to obtain physical-layer cell identities (IDs). The physical-layer cell ID can be expressed by 168 physical-layer ID groups and 3 physical-layer IDs belonging to each physical-layer ID group. That is, a total number of physical-layer cell IDs is 504, and the physical-layer cell IDs are expressed by a physical-layer ID group in the range of 0 to 167 and physical-layer IDs included in each physical-layer cell ID and having a range of 0 to 2. The PSS may use 3 ZC sequence root indices indicating the physical-layer IDs. The SSS may use 168 m-sequence indices indicating the physical-layer cell ID groups.

In the PSS, a ZC sequence with a length of $N_{ZC}=63$ is mapped to 64 subcarriers including a DC subcarrier. A ZC sequence d(n) with a length of $N_{ZC}=63$ can be generated by Equation 5.

MathFigure 5

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{[Math. 5]}$$

In this case, a root index u indicating a physical-layer ID of a physical-layer cell ID group is as shown in Table 1.

TABLE 1

| physical-layer ID | Root index u |
|---|---|
| 0 | 25 |
| 1 | 29 |
| 2 | 34 |

A BS selects one of the 3 PSSs and transmits the selected PSS by carrying it on a last OFDM symbol in each of a $0^{th}$ slot and a $10^{th}$ slot.

In the SSS, two sequences, each with a length of N=31, are mapped to 63 subcarriers including the DC subcarrier. A sequence for the SSS can be generated by Equation 6.

MathFigure 6

$$d(2n) = \begin{cases} s_0^{(m_0)}(n)c_0(n) & \text{in slot 0} \\ s_1^{(m_1)}(n)c_0(n) & \text{in slot 10} \end{cases} \quad \text{[Math. 6]}$$

$$d(2n+1) = \begin{cases} s_1^{(m_1)}(n)c_1(n)z_1^{(m_0)}(n) & \text{in slot 0} \\ s_0^{(m_0)}(n)c_1(n)z_1^{(m_1)}(n) & \text{in slot 10} \end{cases}$$

Herein, $s_x^{(m)}(n)$ denotes the SSS, $c_x^{(n)}$ denotes a PSS based-scrambling code, and $z_x^{(m)}(n)$ denotes a segment based scrambling code. The SSS is scrambled into two scrambling codes.

Equation 7 shows a generating polynomial of an m-sequence for generating the SSS and PSS-based scrambling code and the segment based scrambling code.

MathFigure 7

$$s_x = x^5 + x^2 + 1$$

$$c_x = x^5 + x^3 + 1$$

$$z_x = x^5 + x^4 + x^2 + x^1 + 1 \quad \text{[Math. 7]}$$

The SSS and PSS-based scrambling code and the segment based scrambling code use a cyclic shift version of a sequence generated from the generating polynomial of the m-sequence.

In a case where the unicast service and the MBMS are supported together in the radio frame using the normal CP and the radio frame using the extended CP, the MBMS cannot be supported in a $0^{th}$ subframe and a $5^{th}$ subframe which are assigned with the PSS, the SSS, and the P-BCH and in which a unicast UE performs initial cell search and non-initial cell search procedures and obtains broadcast information. In addition, the PSS, the SSS, and the P-BCH are channels used by the UE to perform initial synchronization acquisition, cell search, and broadcast information acquisition and must be transmitted within 1.4 MHz that is a minimum unit of measurable bands. 73 subcarriers including the DC subcarrier are included in a range of 1.4 MHz.

Figure 5:
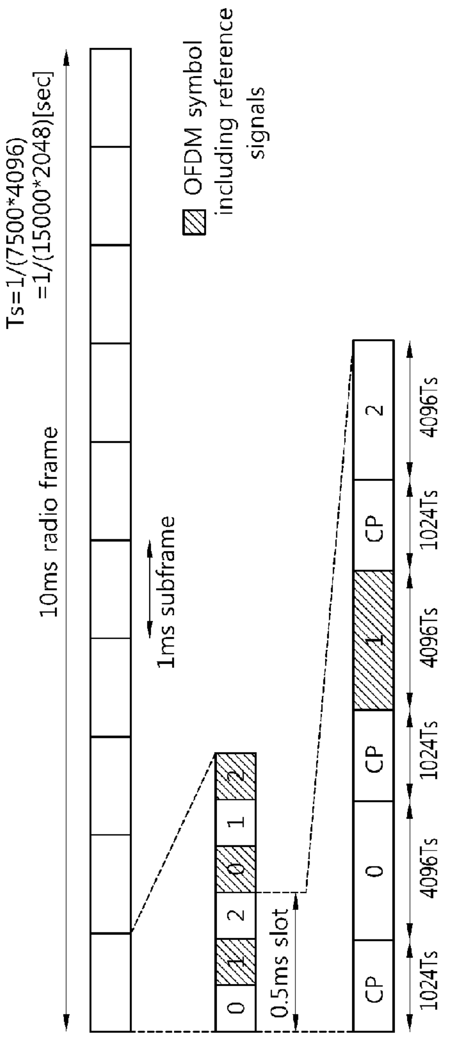
FIG. 5 shows a radio frame for a dedicated MBMS.

FIG. 5 shows a radio frame for a dedicated MBMS.

Referring to FIG. 5, the dedicated MBMS is a service for providing only the MBMS and can obtain a single frequency network (SFN) combining gain by transmitting the same information in all cells. The SFN combining gain denotes a diversity gain obtained by a UE by transmitting the same information for each cell without an extra operation. In the dedicated MBMS, information obtained through a P-BCH is equally transmitted in all cells, and thus the SFN combining gain can be obtained. The radio frame of FIG. 3 and FIG. 4 can be referred to as a radio frame for unicast. The radio frame for the dedicated MBMS has a different structure from the radio frame for unicast so as to obtain the SFN combining gain.

The radio frame for the dedicated MBMS may consist of 10 subframes. One subframe may include two slots. One slot may include three OFDM symbols.

In a radio frame of a system providing a unicast service, a subcarrier has a spacing of 15 kHz and an effective OFDM symbol is 2048 Ts. On the other hand, in the radio frame for the dedicated MBMS, a subcarrier may have a spacing of 7.5 kHz and an effective OFDM symbol may be 4096 Ts (i.e., $Ts=1/(15000\times2048)$sec). That is, the spacing of the subcarrier is reduced by half, and the effective OFDM symbol is doubled in size. A CP size may be 1024 Ts, that is, double of an extended CP size. Therefore, in the radio frame of 10 ms for the dedicated MBMS, one slot includes 3 OFDM symbols. In the radio frame for the dedicated MBMS, reference signals may be arranged with an interval of one OFDM symbol. For example, the reference signals may be arranged in $1^{st}$, $3^{rd}$, and $5^{th}$ OFDM symbols (starting from a $0^{th}$ OFDM symbol) within a subframe of 1 ms.

The structure of the aforementioned radio frame, that is, the radio frame using the normal CP or the radio frame using the extended CP or the radio frame for the dedicated MBMS is for exemplary purposes only, and thus the number of subframes included in the radio frame and the number of slots included in the subframe may change variously. The position or number of OFDM symbols in which the PSS and the SSS are arranged on a slot is for exemplary purposes only, and thus may change variously according to a system.

Figure 6:
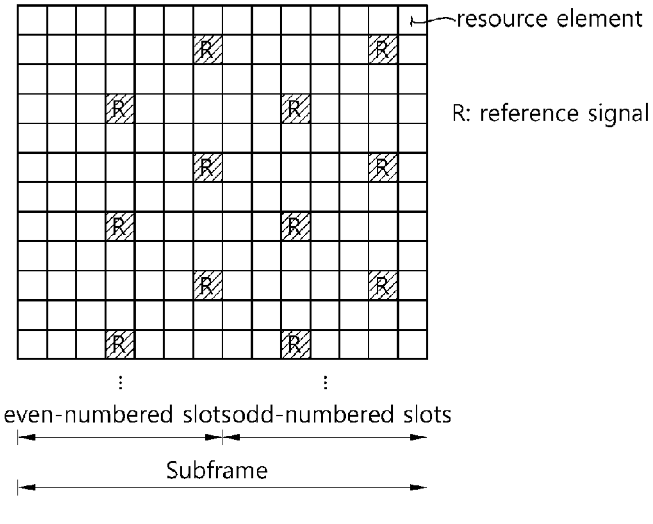
FIG. 6 shows an exemplary structure of a reference signal in a subframe for unicast using a normal cyclic prefix (CP).
Figure 7:
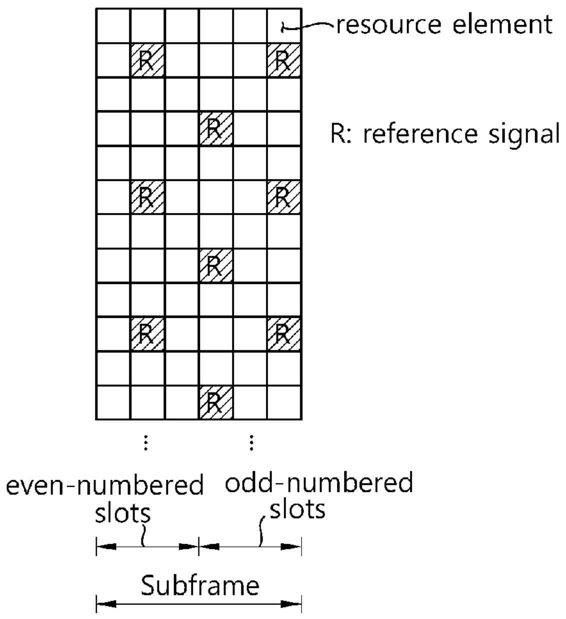
FIG. 7 shows an exemplary structure of a reference signal in a subframe for a dedicated MBMS.

FIG. 6 shows an exemplary structure of a reference signal in a subframe for unicast using a normal CP. FIG. 7 shows an exemplary structure of a reference signal in a subframe for a dedicated MBMS.

Referring to FIG. 6 and FIG. 7, a resource element is defined with one OFDM symbol and one subcarrier. In the subframe for unicast, reference signals are arranged with an interval of 3 resource elements in a time domain and with an interval of 2 resource elements in a frequency domain. On the other hand, in the subframe for the dedicated MBMS, the reference signals are arranged with an interval of 2 resource elements in the time domain and with an interval of 2 resource elements in the frequency domain. It can be seen that the unicast reference signal has a different structure from the dedicated MBMS reference signal.

In a process of obtaining a synchronization signal by using a PSS and an SSS and in a process of receiving system information through a P-BCH, a UE cannot know whether a unicast type or a dedicated MBMS type is used as a transmission type of a cell. Therefore, in a decoding process of the P-BCH, the UE has to perform blind detection for the two service types by performing channel estimation on both the unicast reference signal and the dedicated MBMS reference signal. As a result, a process of obtaining initial control information (e.g., a synchronization signal and system information) may be delayed, and system complexity may be increased.

Now, a method is described whereby a UE can effectively detect a PSS and an SSS and can perform MBSFN combining decoding of a P-BCH irrespective of whether a transmission type of a BS is a unicast type or a dedicated MBMS type. Hereinafter, a synchronization band denotes a frequency band used for the PSS, the SSS, and the P-BCH, and a usual band denotes a frequency band used to transmit unicast data and/or dedicated MBMS data. The synchronization band may use an intermediate frequency band in a full frequency band. The usual band may use a frequency band excluding the synchronization band in the full frequency band. The synchronization band may have a range of 1.4 MHz around a center frequency of the full frequency band. The position of the synchronization band in the full frequency band is not limited thereto, and thus the synchronization band may use any band in the full frequency band and may use two or more frequency bands.

<First Structure of Dedicated MBMS Radio Frame>

Figure 8:
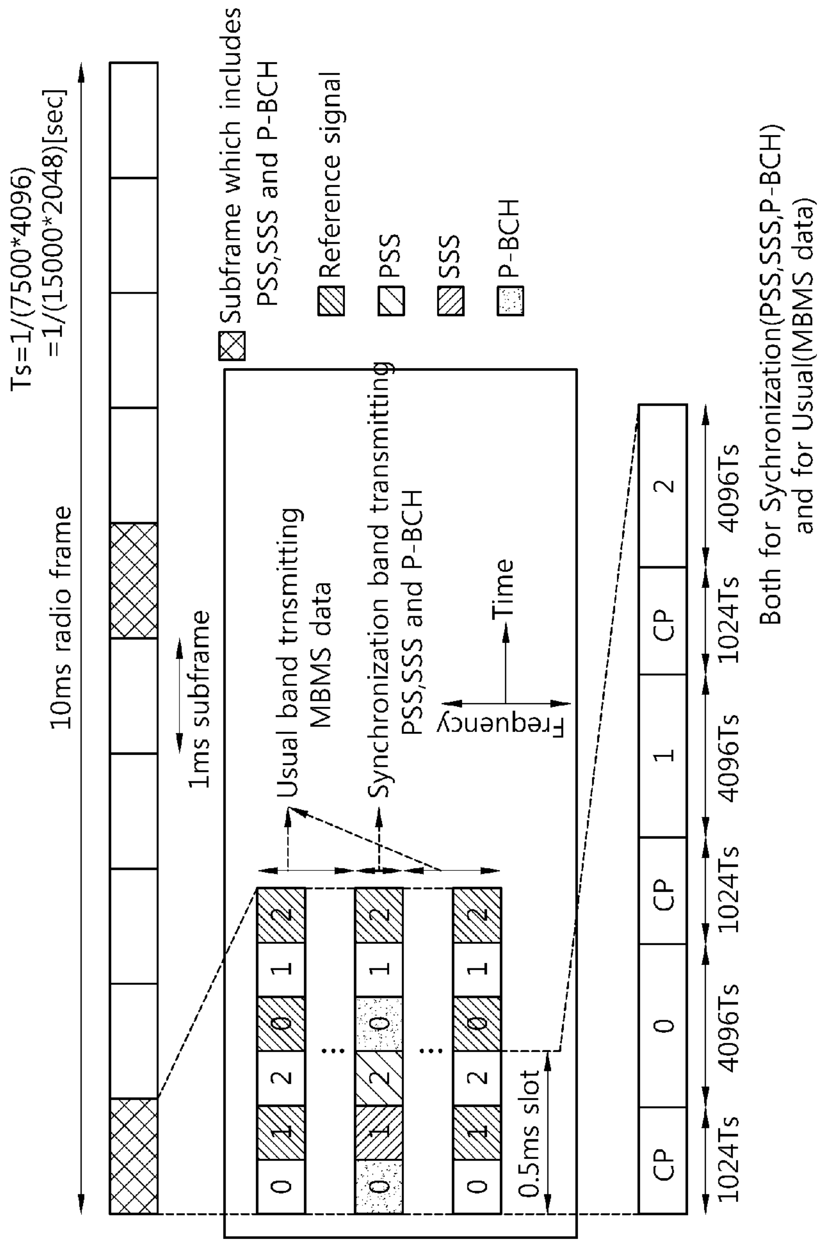
FIG. 8 shows a radio frame for a dedicated MBMS according to an embodiment of the present invention.

FIG. 8 shows a radio frame for a dedicated MBMS according to an embodiment of the present invention.

Referring to FIG. 8, the radio frame for the dedicated MBMS is divided into a usual band and a synchronization band in a frequency domain. The usual band is used to transmit MBMS data. The synchronization band is used for a PSS, an SSS, and a P-BCH. The usual band and the synchronization band have the same structure in a time domain. The usual band and the synchronization band are multiplexed using a frequency division multiplexing (FDM) scheme.

The PSS and the SSS of the synchronization band may have the same definition as in the radio frame supporting unicast. That is, the PSS is mapped to a last OFDM symbol in each of a $0^{th}$ slot and a $10^{th}$ slot, and the SSS is mapped to an immediately previous OFDM symbol in the last OFDM symbol in each of the $0^{th}$ slot and the $10^{th}$ slot. Regarding the PSS, the same sequence is transmitted through two OFDM symbols. Regarding the SSS, different sequences are transmitted through two OFDM symbols.

Regarding the P-BCH, the number of OFDM symbols in use may be regulated according to information transmitted at the synchronization band. For example, the P-BCH may be determined to start at a $0^{th}$ OFDM symbol of a $0^{th}$ subframe and to occupy two OFDM symbols excluding the PSS and the SSS.

Reference signals may be arranged in $1^{st}$, $3^{rd}$, and $5^{th}$ OFDM symbols (starting from a $0^{th}$ OFDM symbol). The reference signals may be arranged as shown in FIG. 7. Since the usual band and the synchronization band have the same structure in the time domain, the reference signals may be arranged in the SSS and the P-BCH. Symbols of the SSS are mapped by being punctured in a resource element to which the reference signal is arranged. In the P-BCH, symbols of system information are mapped by avoiding a resource element to which the reference signal is arranged. That is, the symbols of the system information are not punctured in the P-BCH.

In the radio frame supporting the unicast service, the P-BCH uses 72 subcarriers (excluding the DC subcarrier) within 1.4 MHz and 288 resource elements in a range of 4 OFDM symbols. In the radio frame for the dedicated MBMS, the P-BCH may use 144 subcarriers (herein, a subcarrier spacing of the dedicated MBMS is half of a subcarrier spacing of unicast) within 1.4 MHz and 288 resource elements in a range of 2 OFDM symbols. That is, in the radio frame for unicast and the radio frame for the dedicated MBMS, the P-BCH can use the same number of resource elements.

A PSS in a dedicated MBMS radio frame will be described.

In order for a UE to know that a cell uses the dedicated MBMS by using a PSS in a cell search procedure, an index of a PSS for the dedicated MBMS is defined, wherein the PSS for the dedicated MBMS has a different length from a PSS for unicast.

In the radio frame for the dedicated MBMS, a ZC sequence with a length of 125 or 127 is used as the PSS for the dedicated MBMS. In a radio frame for unicast, the PSS for unicast uses root indices u=25, 29, and 34 in a ZC sequence with a length of 63. A subcarrier spacing is 15 kHz in the radio frame for unicast whereas a subcarrier spacing is 7.5 kHz in the radio frame for the dedicated MBMS. Considering this fact, a ZC sequence having a PSS with a length two times higher than the PSS for unicast is used as the PSS for the dedicated MBMS.

(1) Sequence Generation for PSS for Dedicated MBMS

A ZC sequence d(n) of a frequency domain is used for a PSS in a dedicated MBMS and can be generated according to Equation 8.

MathFigure 8

$$d_u(n) = \begin{cases} e^{-j\frac{\pi u n(n+1)}{N_{ZC}}} & n = 0, 1, \ldots , (N_{ZC}-1)/2 - 1 \\ e^{-j\frac{\pi u(n+1)(n+2)}{N_{ZC}}} & n = (N_{ZC}-1)/2, \\ & (N_{ZC}-1)/2+1, \ldots , N_{ZC}-2 \end{cases} \quad \text{[Math. 8]}$$

A length $N_{ZC}$ of the ZC sequence used as the PSS for the dedicated MBMS may be 125 or 127. A ZC sequence having a low frequency offset sensitivity may be used as the PSS for the dedicated MBMS.

Figure 9:
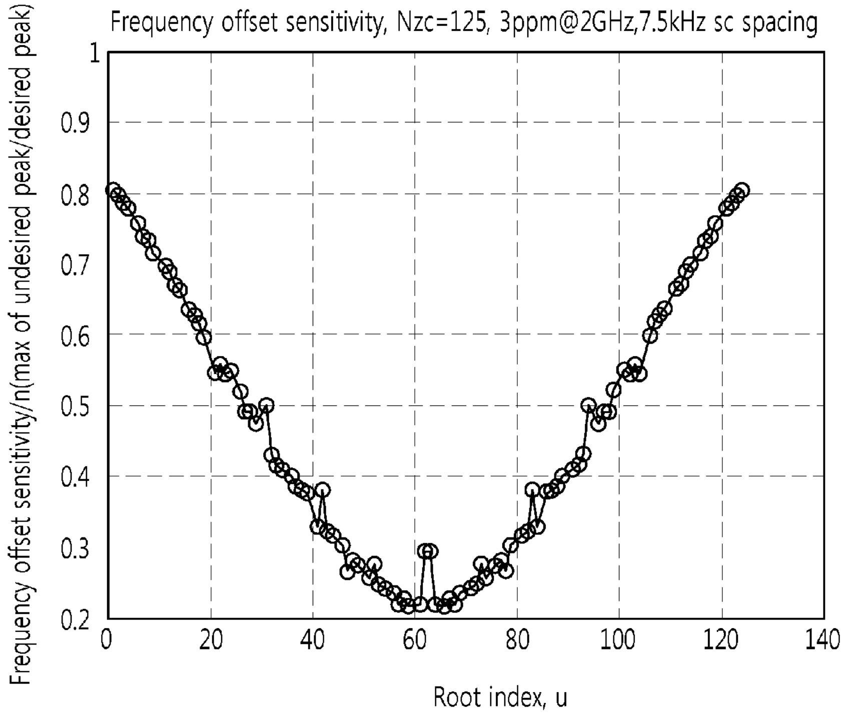
FIG. 9 is a graph showing a frequency offset sensitivity of a primary synchronized signal (PSS) generated from a Zadoff-Chu (ZC) sequence with a length of $N_{ZC}$=125.
Figure 10:
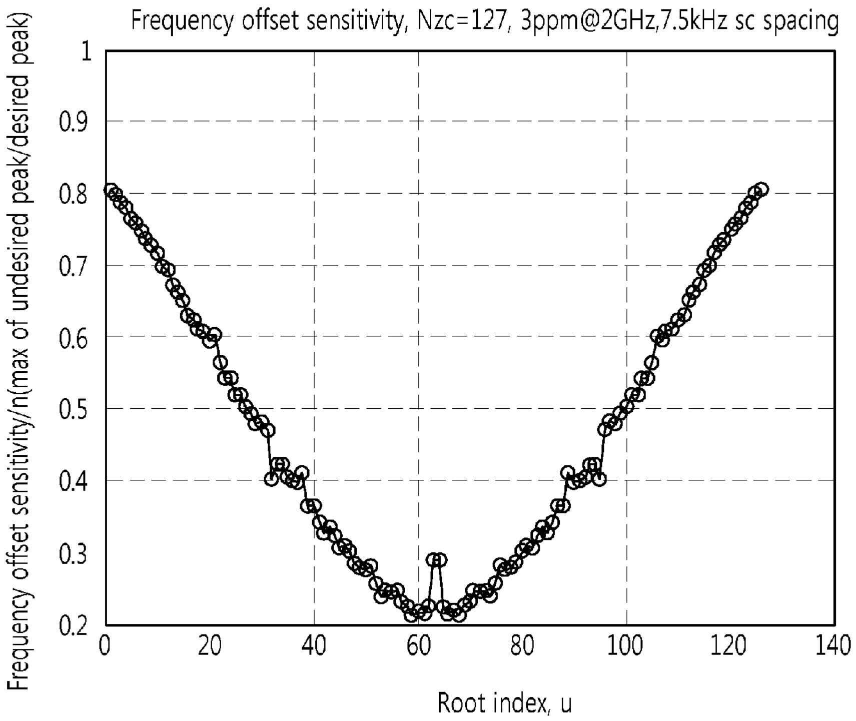
FIG. 10 is a graph showing a frequency offset sensitivity of a PSS generated from a ZC sequence with a length of $N_{ZC}$=127.

FIG. 9 is a graph showing a frequency offset sensitivity of a PSS generated from a ZC sequence with a length of $N_{ZC}$=125. FIG. 10 is a graph showing a frequency offset sensitivity of a PSS generated from a ZC sequence with a length of $N_{ZC}$=127.

Referring to FIG. 9 and FIG. 10, 6 root indices u having a low frequency offset sensitivity of the PSS generated from the ZC sequence with a length of $N_{ZC}$=125 are as shown in Table 2.

TABLE 2

| | u | | | | | |
|---|---|---|---|---|---|---|
| | 59 | 66 | 61 | 64 | 68 | 57 |
| frequency offset-sensitivity | 0.2176 | 0.2176 | 0.2195 | 0.2195 | 0.2209 | 0.2209 |

6 root indices u having a low frequency offset sensitivity of the PSS generated from the ZC sequence with a length of $N_{ZC}$=127 are as shown in Table 3.

TABLE 3

| | u | | | | | |
|---|---|---|---|---|---|---|
| | 68 | 59 | 66 | 61 | 60 | 67 |
| frequency offset-sensitivity | 0.2132 | 0.2132 | 0.2152 | 0.2152 | 0.2167 | 0.2167 |

A ZC sequence corresponding to a root index selected from Table 2 or Table 3 may be used as the PSS for the dedicated MBMS. The root index may be used as an MBMS indicator indicating that the dedicated MBMS is served. The PSS for the dedicated MBMS is mapped to a resource element of the frequency domain.

(2) Resource Element Mapping of PSS for Dedicated MBMS

A PSS is transmitted through $0^{th}$ and $10^{th}$ slots. The PSS is mapped to a resource element in each of the $0^{th}$ and $10^{th}$ slots.

Equation 9 shows mapping of a ZC sequence d(n) onto the resource element.

MathFigure 9

$$a_{k,l} = d(n) \quad \text{[Math. 9]}$$
$$k = n - \frac{(N_{ZC}-1)}{2} + \frac{N_{RB}^{DL} N_{sc}^{RB}}{2}$$
$$l = N_{symb}^{DL} - 1$$
$$n = 0, \ldots , N_{ZC} - 2$$

Herein, when (k,l) indicates a resource element having a frequency-domain index k and a time-domain index l, $a_{k,l}$ denotes a value of the resource element (k,l).

$N_{sc}^{RB}$ denotes a frequency-domain size of the resource element and is expressed by the number of subcarriers (in case of the dedicated MBMS, the number of subcarriers is 24).

$N_{RB}^{DL}$ indicates a configuration of a downlink bandwidth expressed in a unit of $N_{sc}^{RB}$

.

$N_{symb}^{DL}$ indicates the number of OFDM symbols of a downlink slot, and may be 3 in case of the dedicated MBMS.

In the $0^{th}$ slot and the $10^{th}$ slot, the resource element of Equation 10 is reserved instead of being used to transmit the PSS.

MathFigure 10

$$k = n - \frac{(N_{ZC}-1)}{2} + \frac{N_{RB}^{DL} N_{sc}^{RB}}{2} \quad \text{[Math. 10]}$$
$$l = N_{symb}^{DL} - 1$$
$$n = \frac{(N_{ZC}-1)}{2} - \frac{N_{RB}^{DL} N_{sc}^{RB}}{2}, \ldots , -1,$$
$$N_{ZC} - 1, \ldots , \frac{N_{RB}^{DL} N_{sc}^{RB}}{2} + \frac{(N_{ZC}-1)}{2} - 1$$

Figure 11:
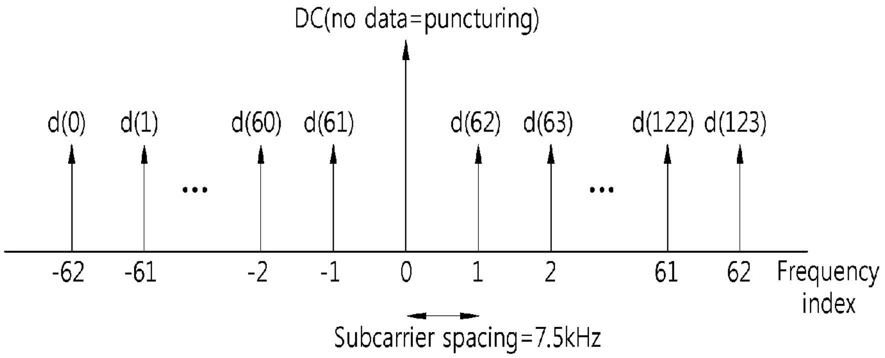
FIG. 11 shows mapping of a ZC sequence according to an embodiment of the present invention.

FIG. 11 shows mapping of a ZC sequence according to an embodiment of the present invention. This is a case where a ZC sequence with a length of $N_{ZC}$=125 is mapped to a resource element.

Referring to FIG. 11, the ZC sequence with a length of $N_{ZC}$=125 is mapped to 125 subcarriers including a DC subcarrier. The ZC sequence is sequentially mapped from a subcarrier having a frequency index of −62, with the DC subcarrier being located in the center. No data is mapped to the DC subcarrier. A null value is inserted in the DC subcarrier.

Figure 12:
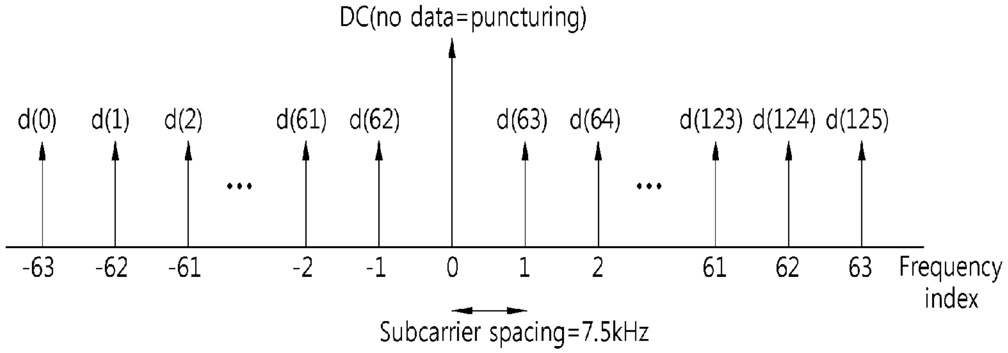
FIG. 12 shows mapping of a ZC sequence according to another embodiment of the present invention.

FIG. 12 shows mapping of a ZC sequence according to another embodiment of the present invention. This is a case where a ZC sequence with a length of $N_{ZC}$=127 is mapped to a resource element.

Referring to FIG. 12, the ZC sequence with a length of $N_{ZC}$=127 is mapped to 127 subcarriers including a DC subcarrier. The ZC sequence is sequentially mapped from a subcarrier having a frequency index of −63, with the DC subcarrier being located in the center. No data is mapped to the DC subcarrier. A null value is inserted in the DC subcarrier. In FIG. 11 and FIG. 12, instead of mapping the ZC sequence to the DC subcarrier, a value n of d(n) is continuously mapped to the DC subcarrier. This is equivalent to puncturing a symbol of the DC subcarrier after continuously mapping the ZC sequence in a frequency domain.

Figure 13:
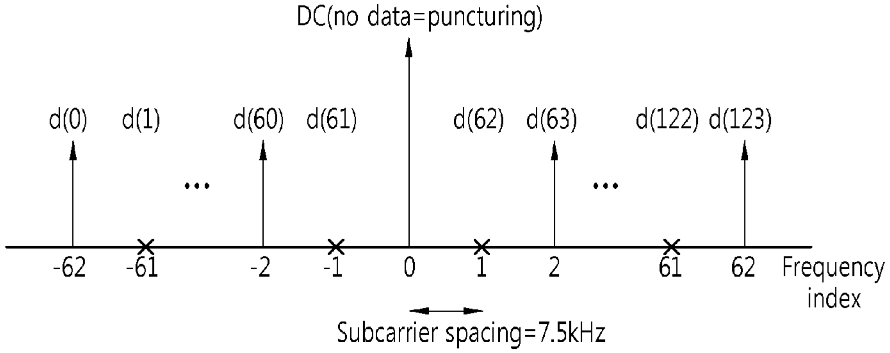
FIG. 13 shows mapping of a ZC sequence according to another embodiment of the present invention.

FIG. 13 shows mapping of a ZC sequence according to another embodiment of the present invention. This is a case where a ZC sequence with a length of $N_{ZC}$=63 is mapped to a resource element.

Referring to FIG. 13, the ZC sequence with a length of $N_{ZC}$=63 is mapped to 125 subcarriers including a DC subcarrier. The ZC sequence with a length of $N_{ZC}$=63 and mapped to the 125 subcarriers can be generated by Equation 11.

MathFigure 11

$$d_u(n) = \begin{cases} e^{-j\frac{\pi u(n/2)(n/2+1)}{63}} & n = 0, 2, \ldots, 58, 60 \\ e^{-j\frac{\pi u((n+1)/2)((n+1)/2+1)}{63}} & n = 63, 65, \ldots, 121, 123 \\ 0 & \text{otherwise} \end{cases} \quad \text{[Math. 11]}$$

With the DC subcarrier being located in the center, the ZC sequence is sequentially mapped from a subcarrier having a frequency index −62 with an interval two times higher than a subcarrier spacing of 7.5 kHz. No data is mapped to the DC subcarrier. A null value is inserted in the DC subcarrier and in a subcarrier to which the ZC sequence is not mapped. The ZC sequence may be repeated two times in a time domain. Herein, u=38 may be used as a root index for the dedicated MBMS. A ZC sequence having the root index u=38 has a conjugate symmetry relation with a ZC sequence having a root index u=25 of the PSS for unicast. It is said that two PSSs have a conjugate symmetry relation when the two PSSs satisfy $u_1+u_2=N_{ZC}$. When the ZC sequence has the conjugate symmetry relation, a correlation output for $u_1$ and $u_2$ can be calculated with one-time computation. The correlation output for $u_1$ and u2 has a computation amount similar to a correlation output for $u_1$ alone. The correlation output for $u_1$ and $u_2$ for time synchronization can be calculated with one-time computation. Alternatively, u=26 and u=37 may be used as the root index for the dedicated MBMS. A ZC sequence of u=26 and a ZC sequence of u=37 also have the conjugate symmetry relation. The root index for the dedicated MBMS can be used as an MBMS indicator indicating whether the dedicated MBMS is served or not.

(3) Generation and Transmission of OFDM Signal of PSS for Dedicated MBMS

In an OFDM symbol l of a downlink slot, a time-continuous signal $S_l^{(p)}(t)$ of an antenna port p is defined by Equation 12 where $0 \le t < (N_{CP,l}+N) \times T_s$.

MathFigure 12

$$s_l^{(p)}(t) = \sum_{k=-\lfloor N_{RB}^{DL} N_{sc}^{RB}/2 \rfloor}^{-1} a_{k^{(-)},l}^{(p)} \cdot e^{j2\pi k \Delta f (t - N_{CP,l} T_s)} + \sum_{k=1}^{\lceil N_{RB}^{DL} N_{sc}^{RB}/2 \rceil} a_{k^{(+)},l}^{(p)} \cdot e^{j2\pi k \Delta f (t - N_{CP,l} T_s)} \quad \text{[Math. 12]}$$

Herein, $k^{(-)} = k + \lfloor N_{RB}^{DL} N_{sc}^{RB}/2 \rfloor$ and $k^{(+)} = k + \lfloor N_{RB}^{DL} N_{sc}^{RB}/2 \rfloor - 1.$ If a subcarrier spacing Δf is 7.5 kHz, N is 4096. $N_{CP}$,l denotes a length of a downlink cyclic prefix (CP) for the OFDM symbol. In the dedicated MBMS, the CP length may be 1024 Ts. The antenna port may be defined as p=4 in the dedicated MBMS, and in this case, a resource block includes 24 subcarriers in a frequency domain. In one slot, the OFDM symbol is transmitted while incrementing a time-domain index l from l=0. The OFDM symbol l starts at a time $\Sigma_{l'=0}^{l-1}(N_{CP,l'}+N)T_s$

.

<Second Structure of Dedicated MBMS Radio Frame>

Figure 14:
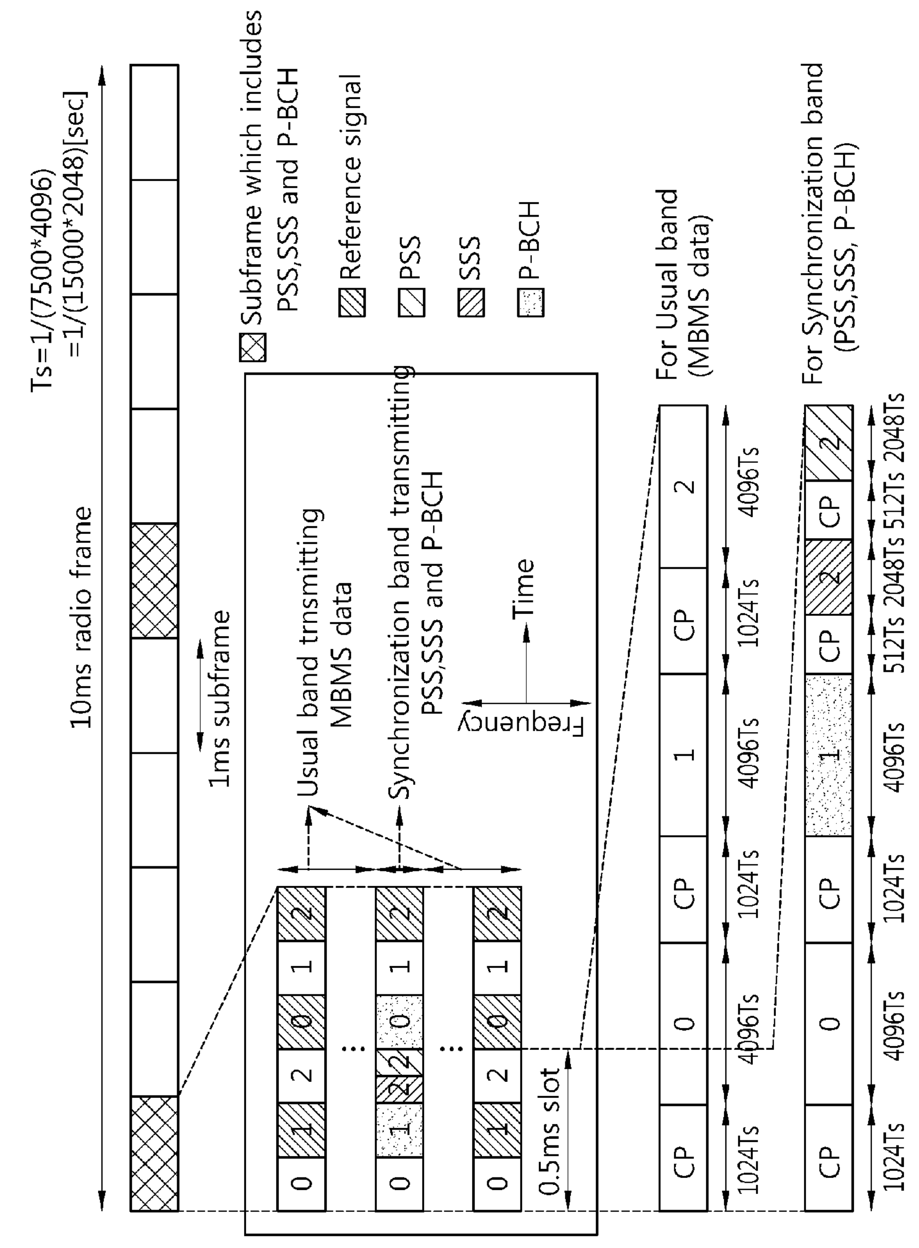
FIG. 14 shows a radio frame for a dedicated MBMS according to another embodiment of the present invention.

FIG. 14 shows a radio frame for a dedicated MBMS according to another embodiment of the present invention.

Referring to FIG. 14, the radio frame for the dedicated MBMS is divided in a frequency domain into a usual band used to transmit MBMS data and a synchronization band used for a PSS, an SSS, and a P-BCH.

The synchronization band uses an OFDM symbol for the PSS and the SSS by decreasing by half a size of an OFDM symbol of the dedicated MBMS. A CP size of the dedicated MBMS is also decreased by half and is then attached to each of the OFDM symbol of the PSS and the SSS. When an OFDM symbol size of the dedicated MBMS is 4096 Ts, an OFDM symbol size of each of the PSS and the SSS is 2048 Ts. When a CP size of the dedicated MBMS is 1024 Ts, the CP size of each of the PSS and the SSS is 512 Ts. That is, in the synchronization band, only an OFDM symbol allocated to the PSS and the SSS has the same size as a subcarrier spacing of 15 kHz for unicast, and remaining OFDM symbols have a size of a subcarrier spacing of 7.5 kHz for the dedicated MBMS.

The usual band consists of a CP and an OFDM symbol of the dedicated MBMS. In the usual band, all OFDM symbols have a size of 4096 Ts that is an OFDM symbol size of the dedicated MBMS, and a CP has a size of 1024 Ts that is a CP size of the dedicated MBMS. In the usual band, all OFDM symbols have a size of a subcarrier spacing of 7.5 kHz for the dedicated MBMS.

In other words, in the radio frame for the dedicated MBMS, the PSS is transmitted through a synchronization band using an OFDM symbol having a half size of the OFDM symbol of the dedicated MBMS. In the radio frame for the dedicated MBMS, the SSS is transmitted through a synchronization band using an OFDM symbol having a half size of the OFDM symbol of the dedicated MBMS. In the radio frame for the dedicated MBMS, the PSS is transmitted through a synchronization band using a subcarrier having a double size of the subcarrier spacing of the dedicated MBMS. In the radio frame from the dedicated MBMS, the SSS is transmitted through a synchronization band using a subcarrier having a double size of the subcarrier spacing of the dedicated MBMS.

Meanwhile, an OFDM symbol of the usual band in the same time domain as the OFDM symbol for the PSS and the SSS of the synchronization band may have a half size of the OFDM symbol of the dedicated MBMS. An example of the radio frame for the dedicated MBMS is shown in FIG. 15.

Figure 15:
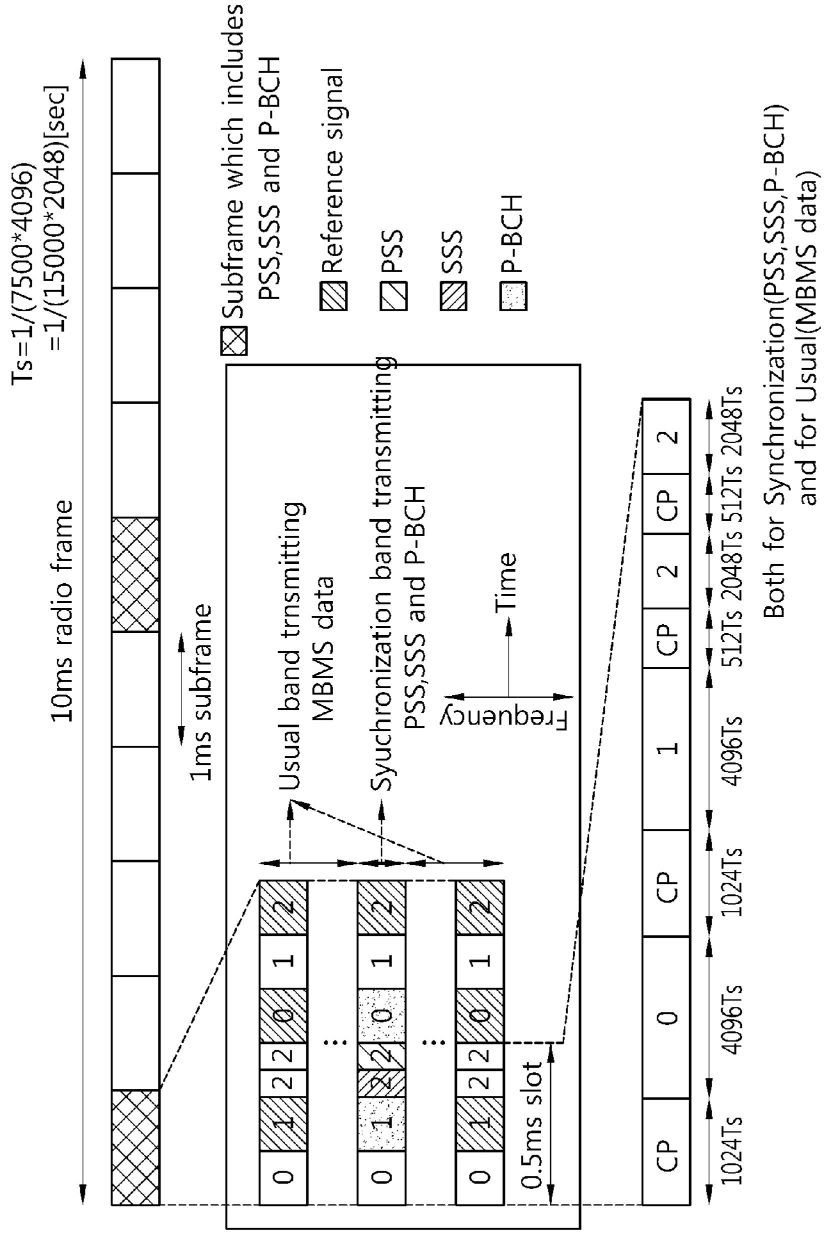
FIG. 15 shows a radio frame for a dedicated MBMS according to another embodiment of the present invention.

FIG. 15 shows a radio frame for a dedicated MBMS according to another embodiment of the present invention.

Referring to FIG. 15, an OFDM symbol assigned to a PSS and an SSS in a synchronization band has a half size of an OFDM symbol of the dedicated MBMS. An OFDM symbol of a usual band in the same time domain as the OFDM symbol for the PSS and the SSS also has a half size of the OFDM symbol of the dedicated MBMS. In the OFDM symbol where the PSS and the SSS are located, both the synchronization band and the usual band have a subcarrier spacing of 15 kHz which is double of a subcarrier spacing of the dedicated MBMS.

In FIG. 14 and FIG. 15, the PSS and the SSS may have the same definition as in the radio frame supporting unicast. The PSS may be transmitted through a last OFDM symbol in each of a $0^{th}$ slot and a $10^{th}$ slot, and the SSS may be transmitted through an immediately previous OFDM symbol in the last OFDM symbol in each of the $0^{th}$ slot and the $10^{th}$ slot. The same sequence may be transmitted through two OFDM symbols. Different sequences may be transmitted through two OFDM symbols. The P-BCH may be determined to start at a $0^{th}$ OFDM symbol of a $0^{th}$ subframe and to occupy two OFDM symbols excluding the PSS and the SSS.

Since the PSS and the SSS of the radio frame for the dedicated MBMS have the same structure as in the radio frame supporting unicast, the PSS and the SSS can be transmitted in the same manner as in unicast. In unicast, root indices u=25, 29, and 34 of the PSS indicate physical-layer IDs included in a cell group ID. When a(u,n) denotes an nth element of a ZC sequence having a root index u, two PSSs satisfying $u_1+u_2=N_{ZC}$ have a relation of $a(u_1,n)=\mathrm{conj}\{a(u_2,n)\}$. This is called a conjugate symmetry relation. Two ZC sequences having the conjugate symmetry relation can calculate a correlation output for $u_1$ and $u_2$ with one-time computation. The root indices u=29 and u=34 for unicast have the conjugate symmetry relation. The root index u=38 having the conjugate symmetry relation with the root index u=25 for unicast may be defined as an MBMS indicator indicating whether the dedicated MBMS is served. Since a UE can calculate the correlation output for u=25 and u=38 with one-time computation, the PSS/SSS for unicast and dedicated MBMS can be searched for without increase of complexity in an initial-cell search procedure. While performing cell search by using the same method as in the unicast service, the UE can determine whether the dedicated MBMS is served. The root index of the PSS can be changed variously, and even in this case, the UE can determine whether the dedicated MBMS is served, simultaneously with cell search. For example, if the root indices for unicast are 31, 29, and 34, the root index 32 may be used for the dedicated MBMS, and if the root indices for unicast are 26, 29, and 34, the root index 37 may be used for the dedicated MBMS.

<Third Structure of Dedicated MBMS Radio Frame>

Figure 16:
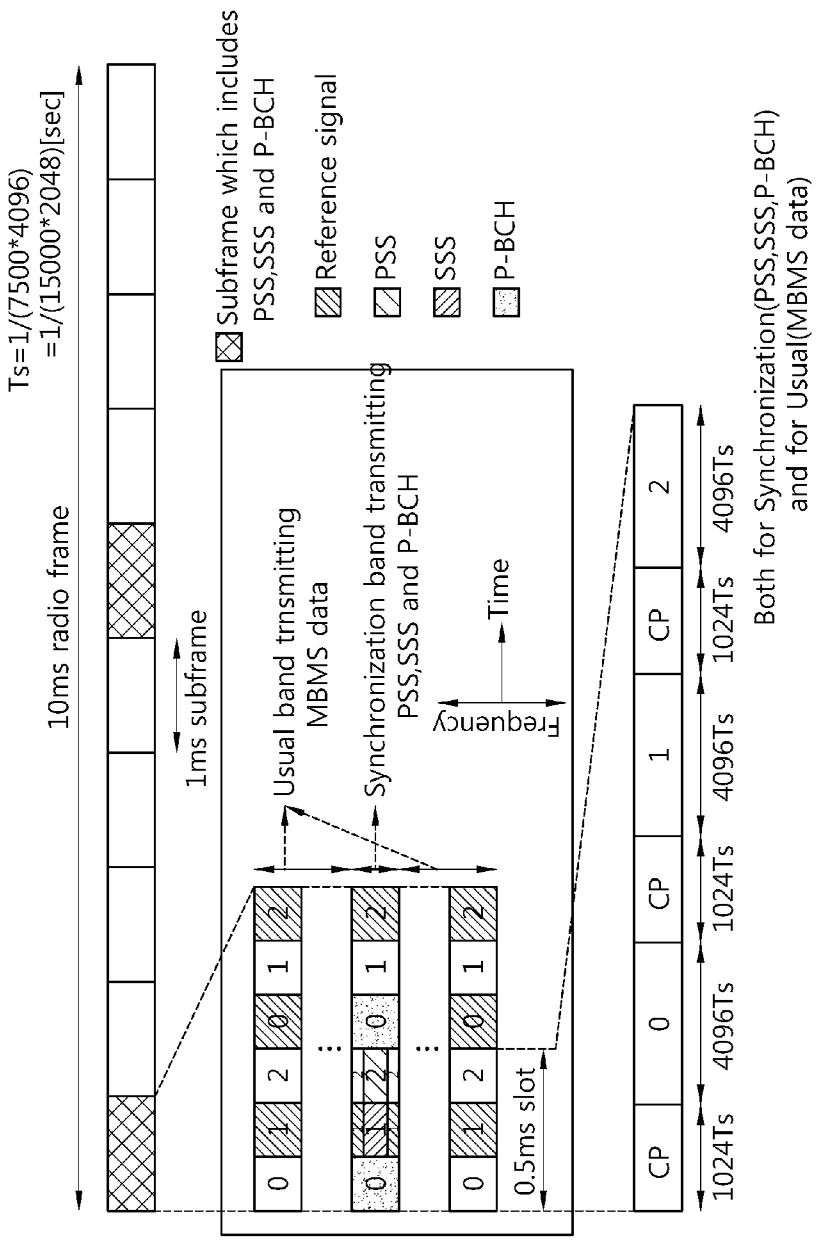
FIG. 16 shows a radio frame for a dedicated MBMS according to another embodiment of the present invention.

FIG. 16 shows a radio frame for a dedicated MBMS according to another embodiment of the present invention.

Referring to FIG. 16, a bandwidth of a PSS and an SSS is decreased by half in comparison with FIG. 8.

The radio frame for the dedicated MBMS is divided in a frequency domain into a usual band used to transmit MBMS data and a synchronization band used for a PSS, an SSS, and a P-BCH. The usual band and the synchronization band have the same structure in a time domain except that a bandwidth of the PSS and the SSS has a half size of a bandwidth of the synchronization band. If the bandwidth of the synchronization band is approximately 0.96 MHz, the bandwidth of the PSS and the SSS is approximately 0.48 MHz.

A sequence with a specific length and capable of being mapped to a PSS having a bandwidth of 0.48 MHz is selected as a sequence of the PSS. If a subcarrier spacing of the dedicated MBMS is 7.5 kHz, a ZC sequence with a length of $N_{ZC}=63$ may be used as the sequence for the PSS. The ZC sequence used for the PSS can be generated according to Equation 8. If the subcarrier spacing is 7.5 kHz, a ZC sequence with a length of $N_{ZC}=63$ and having a low frequency offset sensitivity may be selected for the PSS.

Figure 17:
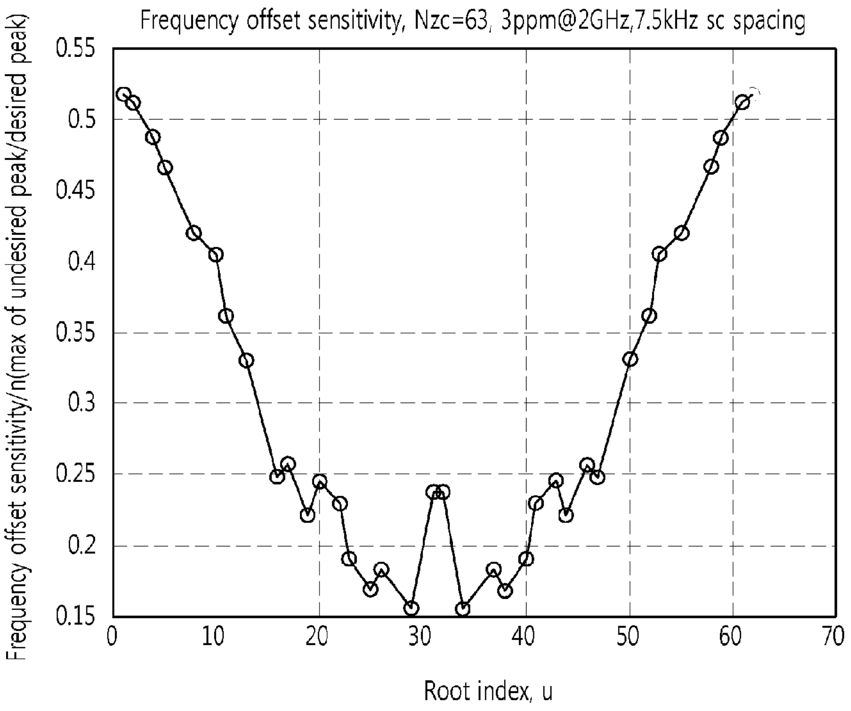
FIG. 17 is a graph showing a frequency offset sensitivity of a PSS generated from a ZC sequence with a length of $N_{ZC}$=63 when a subcarrier spacing is 7.5 kHz.

FIG. 17 is a graph showing a frequency offset sensitivity of a PSS generated from a ZC sequence with a length of $N_{ZC}=63$ when a subcarrier spacing is 7.5 kHz.

Referring to FIG. 17, 6 root indices u having a low frequency offset sensitivity of the PSS generated from the ZC sequence with a length of $N_{ZC}=63$ are as shown in Table 4.

TABLE 4

| | u | | | | | |
|---|---|---|---|---|---|---|
| | 34 | 29 | 25 | 38 | 37 | 26 |
| frequency offset-sensitivity | 0.1558 | 0.1558 | 0.1684 | 0.1684 | 0.1828 | 0.1828 |

A ZC sequence corresponding to a root index selected from Table 4 may be used the PSS. However, when the root indices u=25, 29, and 34 are used in unicast, it is preferable that the PSS for the dedicated MBMS is selected from the remaining root indices. The root index of the PSS for the dedicated MBMS may be used as an indicator indicating that the dedicated MBMS is served.

The PSS is mapped to a resource element of a frequency domain. The PSS may be transmitted through $0^{th}$ and $10^{th}$ slots. The PSS may be mapped to the resource element of the $0^{th}$ and $10^{th}$ slots according to Equation 9. In the $0^{th}$ slot and the $10^{th}$ slot, the resource element of Equation 10 is reserved instead of being used to transmit the PSS.

Figure 18:
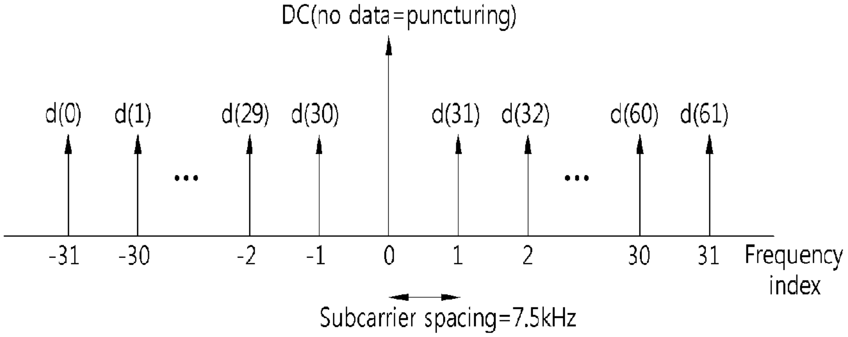
FIG. 18 shows mapping of a ZC sequence according to another embodiment of the present invention.

FIG. 18 shows mapping of a ZC sequence according to another embodiment of the present invention. This is a case where a ZC sequence with a length of $N_{ZC}=63$ is mapped to a resource element when a subcarrier spacing is 7.5 kHz.

Referring to FIG. 18, the ZC sequence with a length of $N_{ZC}=63$ is mapped to 63 subcarriers including a DC subcarrier. The ZC sequence is sequentially mapped from a subcarrier having a frequency index −31, with the DC subcarrier being located in the center. No data is mapped to the DC subcarrier. A null value is inserted in the DC subcarrier. Instead of mapping the ZC sequence to the DC subcarrier, a value n of d(n) is continuously mapped to the DC subcarrier, which is equivalent to puncturing a symbol of the DC subcarrier after continuously mapping the ZC sequence to a frequency domain. An OFDM signal of a PSS can be transmitted by being generated according to Equation 12.

In comparison with a unicast radio frame having a subcarrier spacing of 15 kHz, a subcarrier spacing is decreased by half (i.e., 7.5 kHz) and an OFDM symbol duration is doubled in the dedicated MBMS radio frame. By decreasing by half a bandwidth occupied by the PSS and the SSS in the dedicated MBMS radio frame, the PSS and the SSS can be maintained in the same manner as in the unicast radio frame without an additional overhead. In addition, when the bandwidth occupied by the PSS and the SSS is less than 0.48 MHz and when the bandwidth is sampled into 30.72 MHz and is then received by a UE, the UE can perform a correlation operation by performing decimation with a factor of 1/64 (30.72/0.48=64), thereby reducing complexity in the receiving of the PSS.

In general, cell search is classified into initial cell search initially performed when the UE is powered on and non-initial cell search for performing handover or neighbor cell measurement. The following description will focus on the initial cell search as an example. However, the technical features of the present invention can also apply to the non-initial cell search without modification.

Figure 19:
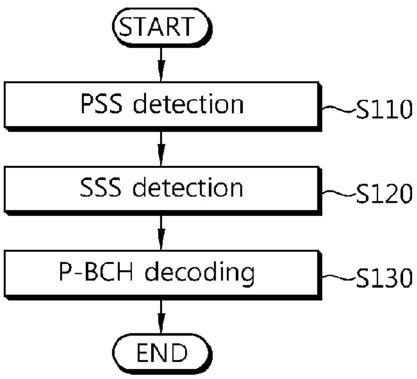
FIG. 19 is a flowchart showing a method for obtaining a synchronization signal and system information according to an embodiment of the present invention.

FIG. 19 is a flowchart showing a method for obtaining a synchronization signal and system information according to an embodiment of the present invention.

Referring to FIG. 19, a UE searches for a PSS (step S110). If a BS provides a dedicated MBMS, the UE can detect the PSS for a dedicated MBMS by searching for a synchronization channel. The UE obtains slot synchronization or symbol synchronization through the PSS. The UE can also obtain frequency synchronization through the PSS. When power is supplied to the UE, the UE performs system synchronization of an initial cell and detects a physical-layer cell ID which is unique for each cell. The initial cell is determined according to a signal-to-interference plus noise ratio (SINR) of the UE at a time when the power is supplied. In general, the initial cell denotes a cell of a BS corresponding to the greatest signal component among signal components of all BSs, wherein the signal components are included in a downlink reception signal of the UE. Through the PSS, the UE can know whether the BS supports a unicast service or the dedicated MBMS. When the PSS for the dedicated MBMS is received, the UE can use an MBMS according to a defined dedicated MBMS radio frame.

The UE searches for an SSS (step S120). The UE obtains frame synchronization through the SSS. In addition, the UE obtains cell ID information by using the SSS and the PSS. Further, the UE can obtain antenna configuration or other information. The UE estimates a channel by using the PSS, and detects the SSS by compensating for the estimated channel.

Thereafter, the UE decodes a P-BCH (step S130). Through the PSS, the UE knows whether a type of a service provided by the BS is a dedicated MBMS type. If the BS supports a unicast service, the UE estimates a channel by using a unicast reference signal and then performs decoding of the P-BCH. If the service provided by the BS is the dedicated MBMS, the UE estimates a channel by using a dedicated MBMS reference signal, and then performs decoding of the P-BCH. In the dedicated MBMS, the UE can obtain an SFN combining gain by performing multicast broadcast single frequency network (MBSFN) combination of broadcast information through the P-BCH. The MBSFN combination is an operation for obtaining a frequency diversity gain and a macro diversity gain by combining downlink signals transmitted equally from a plurality of BSs into self signals.

In a case where the UE cannot know whether the dedicated MBMS is served or not in a process of searching for the PSS or the SSS, the MBSFN combination of the broadcasting information received through the P-BCH cannot be performed. Therefore, the SFN combining gain of the broadcasting information received through the P-BCH cannot be obtained in the dedicated MBMS.

In the proposed method, whether a service type of a cell is a unicast type or a dedicated MBMS type can be known in a cell search procedure. Thus, the UE does not have to estimate a channel for each of the unicast reference signal and the dedicated MBMS reference signal. Further, the UE does not have to perform blind detection for the two service types. Therefore, a process of obtaining an initial control signal such as a synchronization signal and system information can be effectively performed. In addition, the SFN combining gain of the broadcasting information received through the P-BCH can be obtained in the dedicated MBMS.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for obtaining a synchronization signal in a wireless communication system, the method comprising:

dividing a full frequency band into a synchronization band for transmission of the synchronization signal and a usual band for transmission of multimedia broadcast multicast service (MBMS) data, the synchronization band and the usual band having the same structure in a time domain by comprising the same number of orthogonal frequency division multiplexing (OFDM) symbols having the same length, the synchronization band the usual band being multiplexed using a frequency division multiplexing (FDM) scheme;

searching for a primary synchronization signal (PSS) for a dedicated MBMS in the synchronization band, a length of a Zadoff-Chu (ZC) sequence used as the PSS for the dedicated MBMS being two times higher than a length of a ZC sequence used as a PSS for a unicast, the ZC sequence used as the PSS for the dedicated MBMS; and detecting the PSS for the dedicated MBMS through the synchronization band.

2. The method of claim 1, wherein the synchronization band is located at a center of the full frequency band.

3. The method of claim 1, wherein an orthogonal frequency division multiplexing (OFDM) symbol assigned to the PSS for the dedicated MBMS has the same size in the synchronization band and the usual band.

4. The method of claim 1, wherein an OFDM symbol assigned to the PSS for the dedicated MBMS in the synchronization band has a half size of an OFDM symbol of the usual band.

5. The method of claim 1, wherein an OFDM symbol in the same time domain as the PSS for the dedicated MBMS in the usual band has a half size of another OFDM symbol.

6. The method of claim 1, wherein the PSS in the synchronization band has a half bandwidth of the synchronization band.

7. The method of claim 1, further comprising, after detecting the PSS for the dedicated MBMS, receiving broadcasting information transmitted equally by a plurality of base stations through a primary synchronization channel (P-SCH).

* * * * *